United States Patent Office.

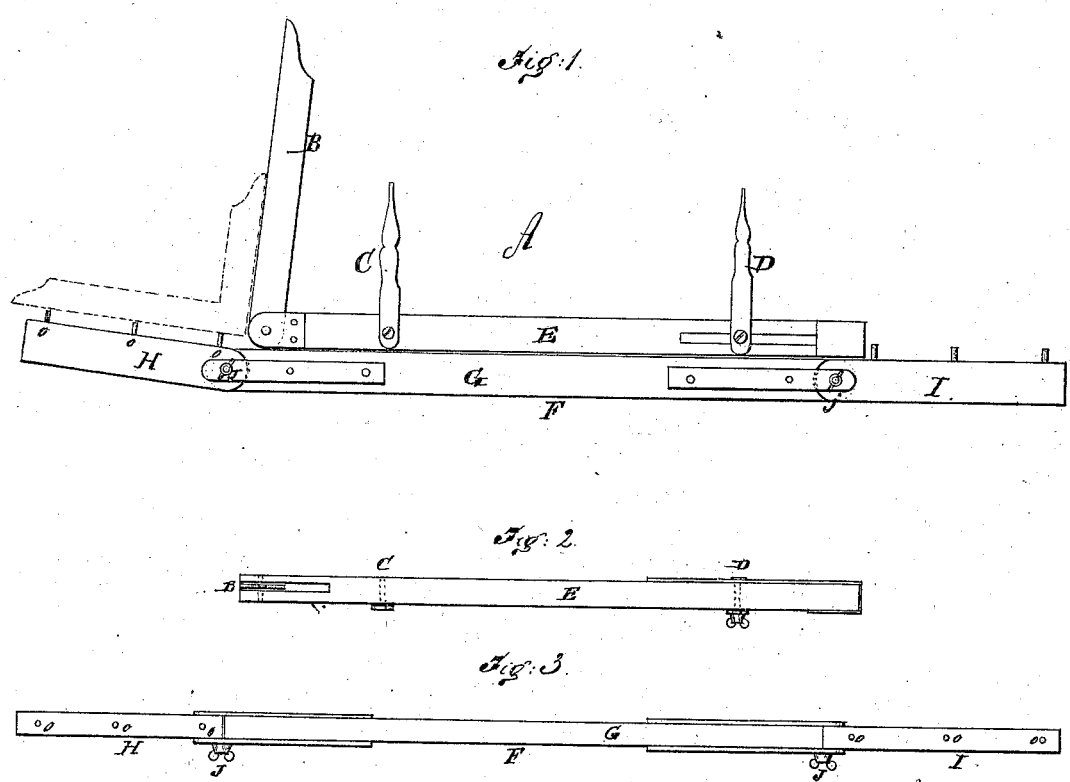

ROLLIN C. KELLY, OF BRANDON, WISCONSIN.

Letters Patent No. 106,373, dated August 16, 1870.

IMPROVEMENT IN AXLE-GAUGE.

The Schedule referred to in these Letters Patent and making part of the same

To all whom it may concern:

Be it known that I, ROLLIN C. KELLY, of Brandon, county of Fond du Lac and State of Wisconsin, have invented a new and useful Improvement in Axle-Gauge; and I do hereby declare that the following is a full, clear, and exact description thereof, which will enable others skilled in the art to make and use the same, reference being had to the accompanying drawing forming part of this specification.

This invention relates to a new and useful Improvement in apparatus for obtaining the true bevel or inclination for the arms of the axles of wheeled vehicles, and consists in the arrangement hereinafter described.

In the accompanying drawing—

Figure 1 represents the apparatus employed and the mode of transferring the bevel to the gauge.

Figure 2 is an edge view of the bevel.

Figure 3 is an edge view of the gauge.

Similar letters of reference indicate corresponding parts.

In constructing wagons and other wheeled vehicles, it is desirable to have some special device for determining the bevel or inclination necessary to give the arms of the axles, in order, when inserted in the hubs, that the inner face of the spokes, when immediately below the axle, should be perpendicular to the ground line and the center line of said axle; and hence, in welding up the axles, the workmen should have some guide to determine the proper set of the bearings.

The device I have invented for this purpose consists of two parts, a bevel and a gauge.

E is the bevel, or that which is applied to the wheel, its tongue, B, which is pivoted to the same, being inserted in the hub, and the arms C and D adjusted, respectively, in contact with one of the spokes and the felly.

The arm D is adjusted in a slot in the bar E, in order to adapt the instrument to wheels of different sizes.

When the bevel is thus adjusted, the tongue B is made fast in its angle to the bar E by means of a set-screw. The bevel is then removed and placed upon the gauge, as shown in fig. 1.

This gauge consists of a central bar with two arms, H, each of which is provided with short studs or pins.

If desired, there may be but one hinged arm, but in that case the opposite end of the gauge-bar must be provided with a stud corresponding in length to those on the arm, and this stud will rest on one arm of the axle when the gauge is applied thereto.

The arm H is adjusted to one limb of a square, whose other limb is in contact with the tongue B, as shown in fig. 1, and the arm is secured at the angle thus obtained by means of the set-screw J. This angle indicates the true bevel or inclination to be given to the arms of the axle. The bevel is always applied to the under side of the axle, and the two preferably correspond in length.

When thus applied, the stud nearest the joint of the arm H is placed against the collar of the axle-arm; or, if the gauge be too short, the next stud may be thus placed. The main convenience in providing the gauge with two arms arises from the occasional necessity of setting the arms of an axle at different inclinations.

Having thus described my invention,

I claim as new and desire to secure by Letters Patent—

The device herein described, consisting of the bar E provided with the tongue B and arms C D, and the gauge-bar G, having jointed ends H I, provided with pins o, all constructed and arranged as and for the purpose specified.

ROLLIN C. KELLY.

Witnesses:
J. P. GLEASON,
GEO. M. WEST.